United States Patent [19]

Briscoe

[11] 4,034,482

[45] July 12, 1977

[54] HEAT RECOVERY SYSTEM

[76] Inventor: Harry H. Briscoe, Rte. 10, Burnett Ferry Road, Rome, Ga. 30161

[21] Appl. No.: 586,631

[22] Filed: June 13, 1975

[51] Int. Cl.² .......................................... F26B 3/00
[52] U.S. Cl. ...................................... 34/35; 34/86; 34/90; 34/19; 165/DIG. 2
[58] Field of Search .............. 34/31, 35, 86, 90, 91, 34/133, 235, 19; 165/DIG. 2, 165; 126/110 R; 237/54.55

[56] References Cited

U.S. PATENT DOCUMENTS

| 2,314,748 | 3/1943 | White | 34/86 |
| 2,882,023 | 4/1959 | Rizzo | 165/DIG. 2 |
| 3,066,423 | 12/1962 | Solem | 34/133 |
| 3,673,701 | 7/1972 | Albertson | 34/133 |
| 3,716,925 | 2/1973 | Hartung | 34/235 |
| 3,936,951 | 2/1976 | Haueise | 34/86 |

*Primary Examiner*—Kenneth W. Sprague
*Assistant Examiner*—James C. Yeung
*Attorney, Agent, or Firm*—Newton, Hopkins & Ormsby

[57] ABSTRACT

A system, process and coupling device for variably and selectively directing hot exhaust gases of a clothes drier into a heat recovery system wherein the heat recovered is introduced into the return air duct of a home heating system or into a venting system when heat exchange is not desired. A system for use with electric driers is shown wherein the exhaust air is filtered and then released into the return air duct of the home heating system, or vented. A system primarily for use with gas driers is shown wherein the exhaust gases pass in heat exchange relationship with intake air of a home heating system.

8 Claims, 9 Drawing Figures

HEAT RECOVERY SYSTEM

BACKGROUND OF THE INVENTION

1. Field of the Invention

The field of this invention is systems for reclaiming the waste heat of clothes driers. In particular, my invention relates to systems for using the waste heat of clothes driers to supplement a home heating system.

2. Description of the Prior Art

Systems are known which attempt to conserve much of the heat exhausted from a clothes drier. Many of these systems recycle the exhaust air, as by preheating air coming into the drier with exhaust air. For example, U.S. Pat. Nos. 2,574,298 and 3,027,653 disclose devices to recapture the heat of condensation of moisture in the exhaust air. Friedman, U.S. Pat. No. 3,050,867 discloses a system for commercial laundries with multiple washers which employs drier exhaust heat to preheat intake water to the clothes washers. A system similar to Friedman is shown in Vaughan U.S. Pat. No. 3,771,238 which utilizes the venting structure disclosed in Angelone U.S. Pat. No. 3,157,391. Angelone teaches the recirculation of the heated exhaust air back into the drier.

None of these devices, nor any other known at this time in the prior art, utilizes drier exhaust heat to preheat the return air in a home heating system. Because of the larger volume of air heated in such a home system, and because the home heating system air is heated to a lower temperature than either drier intake air or clothes washer water, a more complete use of the otherwise waste heat from the drier exhaust is possible with this system.

Additionally, none of the prior art devices provides for a simple switching system to vent the air to the atmosphere in summer, when the home heating system may be used for air conditioning, but to utilize the exhaust drier heat in winter.

No device in the relevant prior art can be easily attached to existing drier units; all are designed for original construction. This system can be made by a simple installation of one or two devices and connecting hoses or ducts in a few hours. Due to the simplicity of the device it can be installed on a drier by an unskilled person with household tools.

SUMMARY OF THE INVENTION

A heat recovery system for use (1) with a clothes drier having an exhaust port through which exhaust gases can be released; and (2) a home heating system having a furnace, a duct in communication with the furnace, and a blower for forcing air through the furnace duct. The system further includes a heat transfer means for transferring heat from the drier exhaust gases to the air in the furnace duct with means for conveying exhaust gases from the exhaust port to the heat transfer means.

DETAILED DESCRIPTION OF THE PREFERRED EMBODIMENTS

The present invention utilizes waste heat from a clothes drier to preheat return air in a home heating system.

The system is easily installable on clothes driers in houses or apartments with existing home heating systems. It can be used with heating-cooling climate control systems because the system can be shut off for the summer in which case the exhaust air from the drier does not pass in heat exchange relation or into the return air of the home heating system, but is instead vented. In winter, when desired, in some embodiments, the exhaust air from the drier does come in heat transfer relation with air being introduced into the home heating system. In embodiments for electric driers, the exhaust air is filtered and injected into the return air of the home heating system, adding both heat and moisture. In embodiments using exhaust (flue) gases from a gas drier primarily, the exhaust gases are directed in the winter position to come into a heat exchange relationship with the return air of the home heating system. Various embodiments are disclosed with differing methods to by-pass the heat exchange during the summer. In the preferred embodiments the exhaust air, or fresh air heated by heat exchange with the exhaust air, is directed into the home heating system only in the winter position or comes into a heat exchange relatiohnip with the return air of the home heating system only in the winter position.

Figure 1:
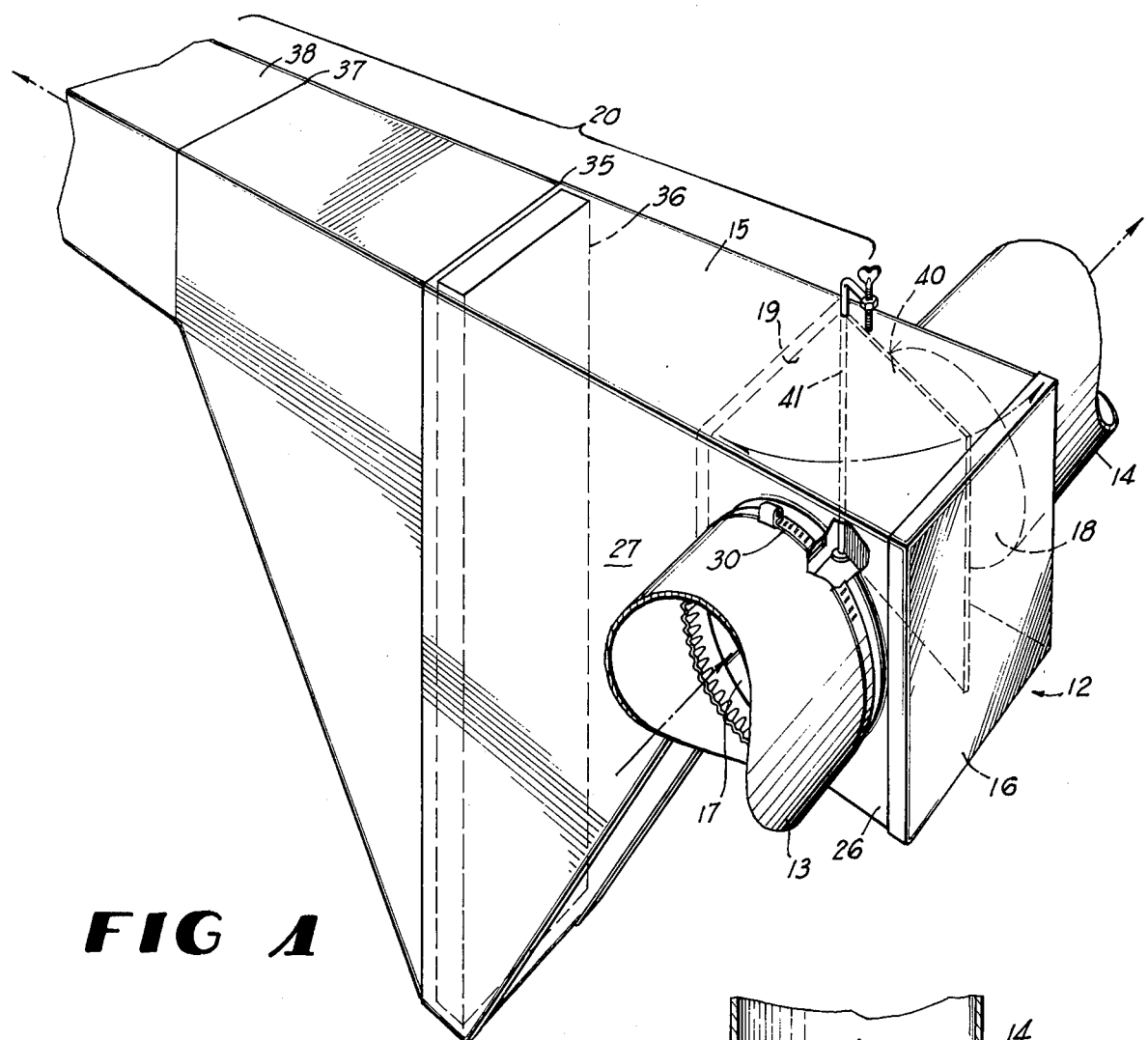
FIG. 1 is a perspective view of the coupling device portion of a system according to a first embodiment of the present invention.
Figure 2:
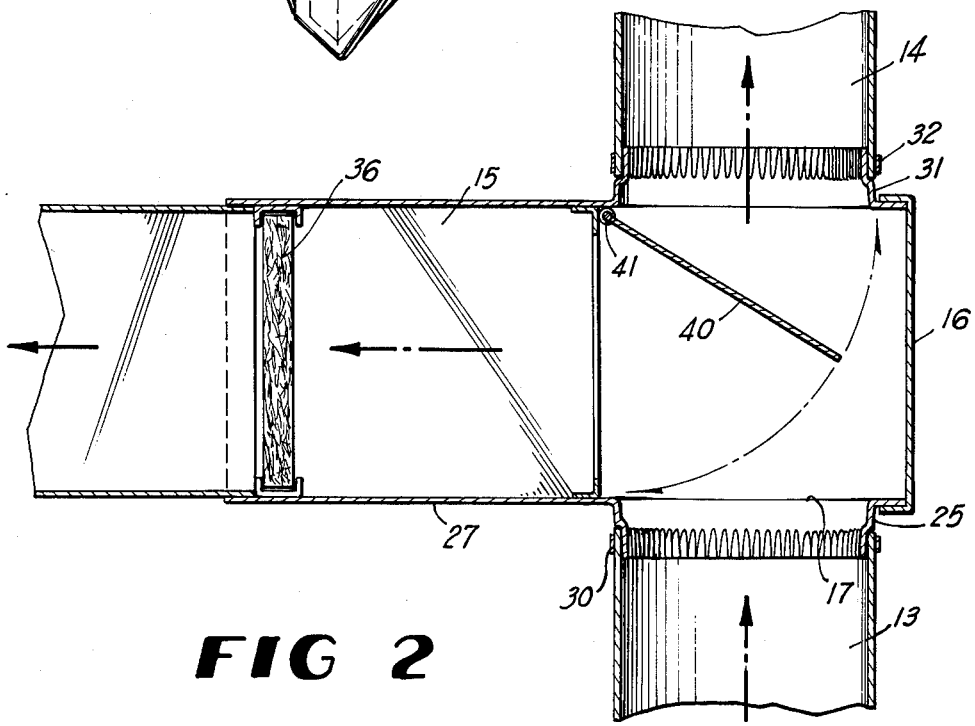
FIG. 2 is a top sectional view of the coupling device shown in FIG. 1.
Figure 3:
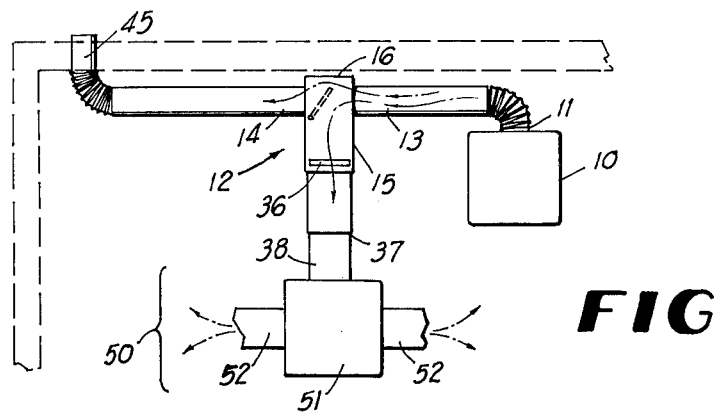
FIG. 3 is a schematic of a system according to the first embodiment of the invention.
Figure 4:
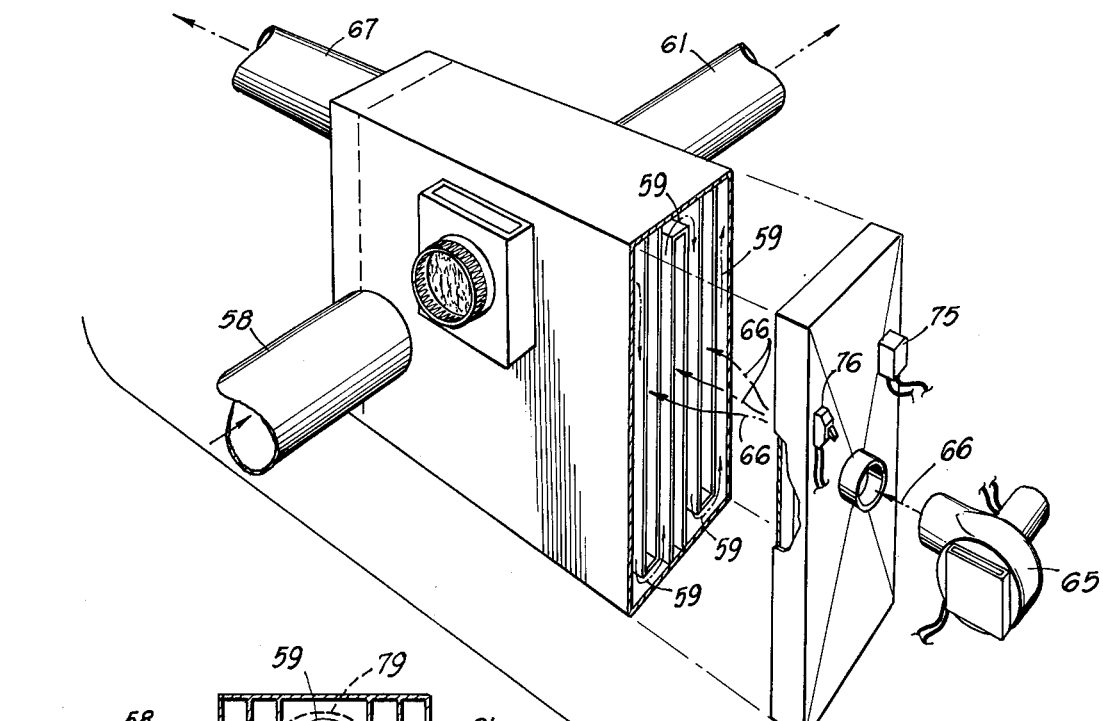
FIG. 4 is a perspective view of the heat exchange portion of a system according to a second embodiment of the present invention.

Referring more particularly to FIGS. 1-3, a system according to the present invention in one preferred form is shown adapted for use with an electric clothes drier 10 having an exhaust port 11. A coupling device 12 is connected to an inlet hose 13, an outlet hose 14, and reclaiming pipe 15. The coupling device in this embodiment is a rectangular solid shaped coupling portion 16 of galvanized steel with circular openings 17 and 18 provided for attaching respectively inlet hose 13 and outlet hose 14. (Both openings are round in the embodiment shown.) A third opening 19 is provided in coupling portion 16 connected to reclaiming pipe 15 and a reclamation system generally indicated by numeral 20. This third opening could also be round and similar in structure to the other two, but is shown in the drawing as square.

The inlet opening 17 is provided with a protruding extension 25 of the coupling portion 16. This protruding extension can conveniently be made by fastening to the other sides of coupling portion 16 one piece of metal as shown in FIGS. 1 and 2 which is formed to be one side 26 of the coupling portion 16 the protruding extension 25 and a side 27 of reclaiming pipe 15. Inlet hose 13 can be attached to the coupling device around the protruding extension 25 by means of a hose clamp 30 and for this purpose it is desirable that inlet hose 13 be of flexible material.

Outlet hose 14 may similarly be attached to protruding portion 31 by hose clamp 32 at outlet opening 18, as is shown in FIG. 2.

The reclaiming pipe 15 has at its interface with coupling portion 16 opening 19 and expands in cross section from opening 19 to a maximum cross section 35 in which is inserted air filter 36. The cross section decreases to a minimum cross-section 37 at which point a branch return air duct 38 is attached.

Within coupling portion 16 is a damper 40 which is rotatable about the line of a quadrant locking screw 41 located at one edge of the damper 40 and along an interior edge of the coupling portion 16 of the coupling device 12.

It can be seen in FIG. 3 that this embodiment is suitable for use with an electric clothes drier 10 with an exhaust port 11 so that exhaust air passes (as shown by the arrows) in opening 17 from inlet hose 13 and, when the damper is blocking the third opening 19 to the reclaiming pipe 15, out the second opening 18 and the outlet hose 14 to a vent 45. But, in the winter or operating position, the damper 40 blocks the second opening 18 so that exhaust air passes from the inlet hose 13 through the inlet opening 17 into the coupling portion 16 and then through the third opening 19 into the reclaiming portion 20. The exhaust air is filtered by the air filter 36 at the maximum cross section 35 and passes through the minimum cross section 37 to connecting pipe 38 and then into the return air duct of a home heating system 50. This flow can best be seen in FIG. 3, wherein 51 is the main furnace and 52 the outlet ducts.

The system is simple in operation in that the damper 40 can be easily adjusted using the adjusting screw 41 between summer and winter positions. In the winter position warm moist air is filtered and then conducted into the return air duct of the home heating system providing additional heat and moisture.

Figure 8:
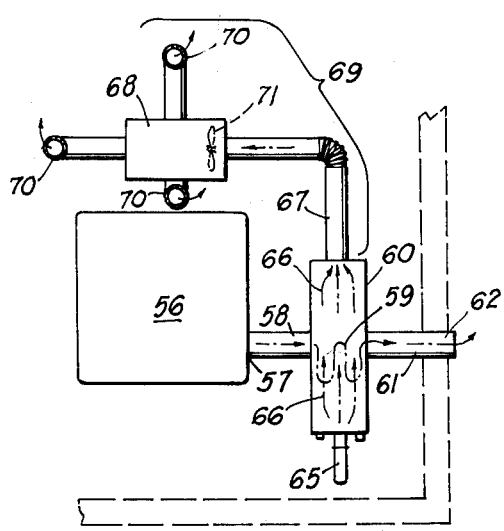
FIG. 8 is a schematic of a system according to the second embodiment of the invention.

The second embodiment, primarily for use with a gas clothes drier, is illustrated in FIGS. 4–8 and can best be seen in the schematic in FIG. 8. A clothes drier 56 is connected at its exhaust port 57 to an exhaust pipe 58 releasing exhaust gases into a first pathway 59 through a heat exchanger 60. The exhaust gases exit through a venting pipe 61 to a vent 62 and into the atmosphere. Fresh air or air from within the home is blown by a blower 65, when the blower is on, through a second set of pathways 66 through the heat exchanger 60 and then through a branch duct 67 to the main furnace 68 of the home heating system 69, which also includes outlet ducts 70 and a main blower 71. It should be understood that the intake for blower 65 can be outside or inside ambient air, or with additional modifications, can be the return air of the home heating system.

Figure 5:
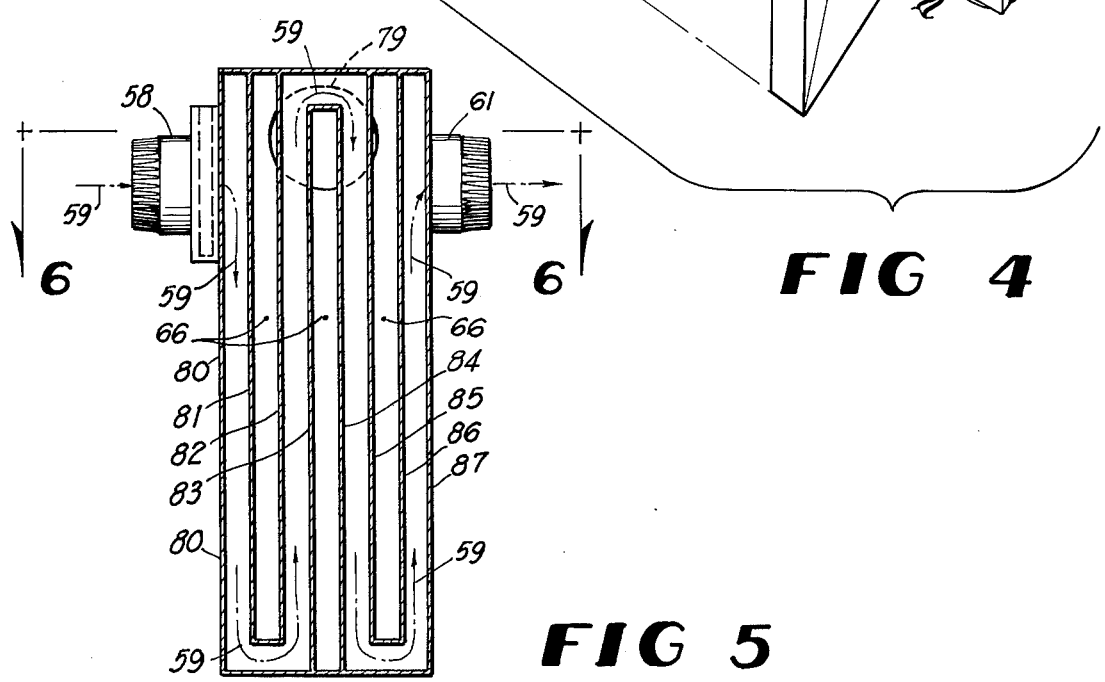
FIG. 5 is an end sectional view of the heat exchanger shown in FIG. 4 along 5—5.
Figure 6:
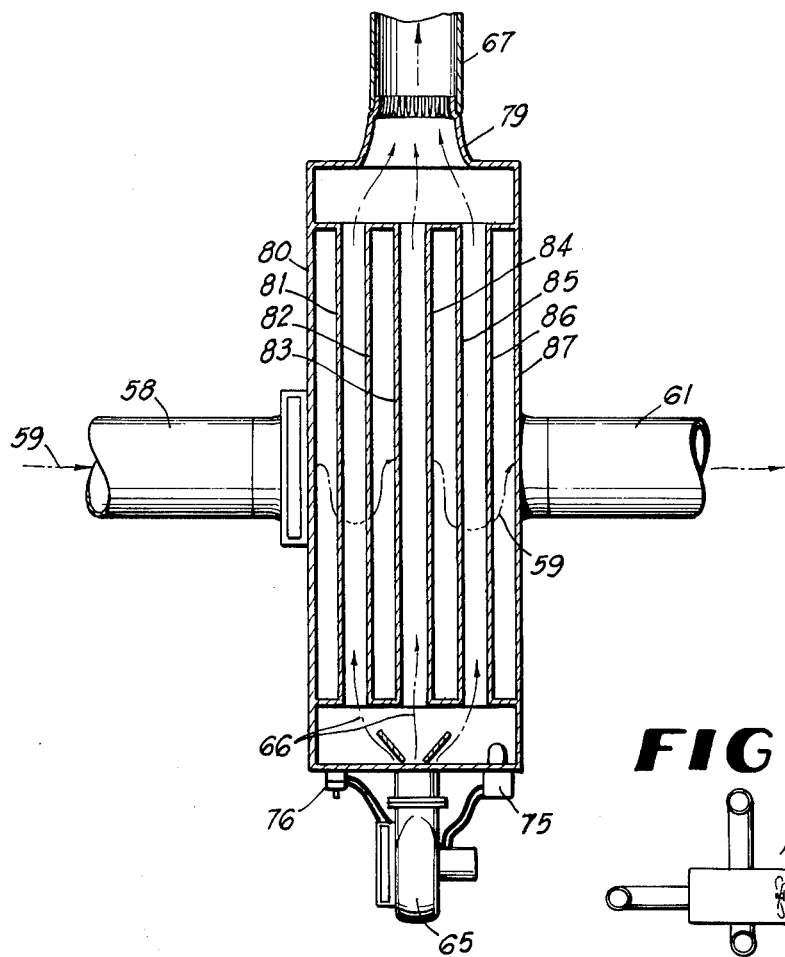
FIG. 6 is a top sectional view of the heat exchanger shown in FIG. 5 along line 6—6.
Figure 7:
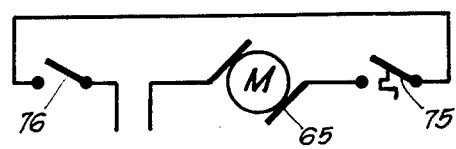
FIG. 7 is a schematic diagram of electric circuitry components of a system according to the second embodiment.

The detail of heat exchanger 60 is shown in FIGS. 4, 5, 6 and 7. Blower 65 is electrically connected to a thermostat 75 and a seasonal switch 76 in series as is indicated in FIG. 7. Thus, unless the thermostat senses warm (over 80°F) exhaust air and the seasonal switch is in the winter (closed) position, no air is blown through the heat exchanger 60 into branch pipe 67. When both conditions are met, the air to be heated is blown by the blower 65 through the second set of pathways 66 and then into connecting pipe 67 through opening 79. Referring particularly to FIG. 5, exhaust gases from the clothes drier pass through exhaust pipe 58 along the first pathway 59 to the venting pipe 61. The first pathway 59 must be closed or captive so as not to allow exhaust gases to escape into the second set of pathways 66 or to the exterior of the heat exchanger 60. Referring particularly to FIG. 6, because of the inner structure formed by the walls 80, 81, 82, 83 and 84, the air to be heated is divided into small passages wherein it can be heated. It can be seen in FIG. 5 that exhaust air passes along the first pathway 59 between walls 80 and 81, between walls 82 and 83, between walls 84 and 85 and between the walls 86 and 87; while in FIG. 6 ambient or fresh air passes, when the blower is on, along pathways 66 between walls 81 and 82, or between walls 83 and 84, or between walls 85 and 86.

It should be apparent that this second embodiment is suitable for extracting waste heat from a gas clothes drier wherein the exhaust air could not be injected directly into the home heating system. The power consumption of the system, entirely through operation of blower 65, is more than compensated for by the heat retrieved from the gas clothes drier.

A simple modification of this embodiment would be to alter the electric circuitry in FIG. 7 so that the main thermostat control of the home heating system is also in series with seasonal switch 76 and thermostat 75. The blower would then not blow air through heat exchanger 60, branch pipe 67 into furnace 68 of home heating system 69 unless the home heating system was also an operating position because of low room temperatures. In the unmodified second embodiment, however, the supplemental heating system, provided by heat exchanger 60, would transmit heat into the home without operation of the primary heating system provided seasonal switch 76 is in the winter or operating position.

Figure 9:
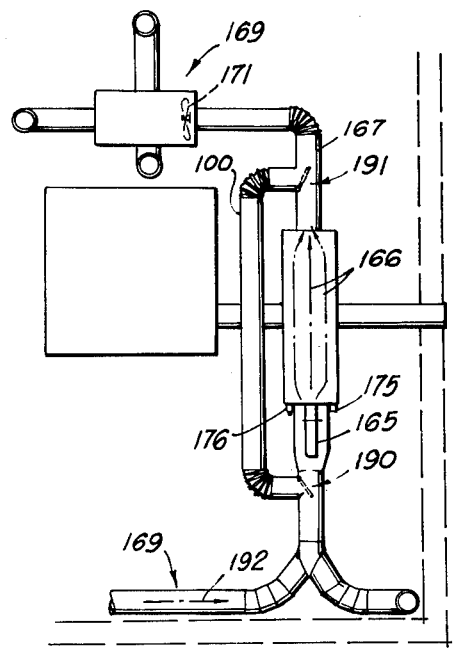
FIG. 9 is a schematic of a system according to a third embodiment of the invention.

A third embodiment is shown in FIG. 9 providing a by-pass 100 from blower 165 to branch pipe 167 with baffles 190 and 191 at either end of the by-pass similar to the coupling device contemplated in the first embodiment with the baffles electrically operated by means of seasonal switch 176. In that embodiment the intake of blower 165 could be the return air flow 192 of the home heating system 169 so that the pressure exerted by the main blower 171 of the home heating system would force air along paths 166 through the heat exchanger 160 enabling blower 165 to be dispensed with altogether. The by-pass 100 would enable such return air to by-pass the heat exchanger when seasonal switch 176 is in the summer position.

While the second and third embodiments shown in FIGS. 4–9 and the modifications herein described are most suitable for use with a gas clothes drier, it is understood that the structure is equally useful with an electric drier except that the moisture introduction achieved by the first embodiment would then be lost. In environments where additional moisture is not needed during the winter, but an electric clothes drier is present, a system according to the second or third embodiment illustrated in FIGS. 4–9 could be used.

Constructed test devices of the type specifically shown and described in FIGS. 1–3 and FIGS. 4–9 demonstrate conservation of heat. Typical results expected from a device according to the first embodiment are shown in tabular form in Table I.

TABLE I

ASSUMPTIONS:
1. Average cost of electric energy is 2.5 cents KW-HR

TABLE I-continued

2. Average dryer cycle is 30 minutes
3. Dryers are operated six (6) times per week.
4. Six months of the year homes in the general area of the Southeastern part of the United States require heating.

Electrical energy requirements for electric dryer cycle.
Temp. into dryer = 72° F
Temp. to atm. = 150° F
Volume of air exhausted to atm. = 43$^{m_3}$/min.
Delta $T_{in} - T_{out} - T_{in}$ = 150° F − 72° F = 78° F
Average dryer max. electrical load = 21 amperes or 5 KW-HR
Since 100% of energy is reclaimed
Reclaimed energy = (½ Hr) (5) $.025
$\underline{\text{Reclaimed energy}}$ = $.0625
cycle Since the electric dryer is exhausting 43$^{m_3}$/min of air to the atmosphere, then 43$^{m_3}$/Min makeup air is entering the home at ambient temperature and must be heated by the heating system.

ASSUMPTION: Ambient Temperature is 40° F
Outdoor air to be heated
Sensible (43 CFM) (72° F − 40° F) (1.08)(½) = 745 BTU/HR
Latent (43 CFM) (35$^{GR}$/#) (.68) (½) = 510 BTU/HR
Totals = 745 + 510 = 1255 BTU/HR cycle Energy cost for Makeup air = $\frac{(1255 \text{ BTU/HR})}{(3412)}$ ($.025) Cycle Energy cost for Makeup air = $.01 cycle Total Energy Savings see cycle = $.0625 + $.01 = $.07
Total Energy Savings per year = ($.07/cycle)
(6 cycles/week) (25 weeks)
Total Energy Savings per year = $10.90
Installed cost of Heat Recovery Device = $21.00
Rate of Return = $\frac{\$10.90 \text{ (energy savings)}}{\$21.00 \text{ (cost of heat recovery device)}}$
Rate of return = 52%
on investment or
The installed system will pay for itself in 1.9 years.

It should be noted that most drier exhaust systems expel a considerable volume of air from the home which must be compensated for in winter by the intake of cold outside air into the home heating system. Otherwise cold outside air leaks in around doors windows, etc. The first embodiment of the present invention reduces overall power consumption by coordinating the venting of drier exhaust air or gases with the introduction into the home heating system of warm, moist air.

The devices constructed according to the invention conserve energy and do not contribute to air pollution because no new heat source is required. If blower 65 is connected to outside air, it replaces vented exhaust air whenever the drier is in full operation and avoids low inside pressures and air leakage.

Since all three systems have few movable parts, for example, damper 40, the systems can be maintained for long lifetimes with little maintenance (as for example by cleaning or replacing filter 36). Because any of the systems can operate independently of the main furnace, it could be used continuously as needed during failures of the furnace.

It should be understood that the just described embodiments merely illustrate principles of the invention in preferred forms. Many modifications, additions and deletions other than those specifically illustrated may, of course, be made thereto without departure from the spirit and scope of the inventions as set forth in the following claims.

What I claim is:

1. A process for recovering heat from the exhaust gases of a clothes drier comprising the steps:
   a. directing said drier exhaust gases through a first pathway;
   b. directing the air flow in a home heating system through a second pathway sealed from and in conductive heat exchange relationship with said first pathway;
   c. selectively bypassing one of said pathways when heat exchange is not desired;
   d. said selectively bypassing step includes variably conducting said exhaust gases around said first pathway, out of heat exchange with said air flow in said second pathway.

2. A process for recovering heat from the exhaust gases of a clothes drier comprising the steps:
   a. directing said drier exhaust gases through a first pathway;
   b. directing the air flow in a home heating system through a second pathway sealed from and in conductive heat exchange relationship with said first pathway;
   c. selectively bypassing one of said pathways when heat exchange is not desired;
   d. said selectively bypassing step includes variably conducting said air flow around said second pathway out of heat exchange with said exhaust gases in said first pathway.

3. A process for recovering heat from the exhaust gases of a clothes drier comprising the steps:
   a. directing said drier exhaust gases through a first pathway;
   b. directing the air flow in a home heating system through a second pathway sealed from and in conductive heat exchange relationship with said first pathway;
   c. selectively bypassing one of said pathways when heat exchange is not desired;
   d. said selectively bypassing step includes variably controlling the air flow through said second pathway according to the amount of heat exchange desired with no air passing through said second pathway when heat exchange is not desired.

4. A heat recovery system comprising:
   a. a clothes drier having an exhaust port through which exhaust gases can be released;
   b. a home heating system including a furnace, at least one duct in communication with said furnace, and a blower for forcing air through said duct between the furnace and the space of the home to be heated;
   c. a vent to the atmosphere;
   d. means for conveying drier exhaust gases from said exhaust port of said clothes drier;
   e. heat transfer means for transferring heat from said drier exhaust gases to said air in said duct including a pathway sealed from and in heat exchange relation with said duct, said pathway leading from said conveying means to said vent, whereby heat is transferred to said duct by conduction;
   f. said heat transfer means is a heat exchanger having a first plurality of internal baffles defining a second plurality of chambers being dimensioned greater in two orthogonal directions than in a third orthogonal direction, said one duct passes in branches through said heat exchanger in a straight path in one of said two orthogonal directions, and said pathway passes through said heat exchanger in said third orthogonal direction in a convoluted path around said chambers having maximum heat exchange contact with the internal baffles defining said second plurality of chambers.

5. A heat recovery system as claimed in claim 4 wherein said one duct is a branch inlet duct to said home heating system and said heat recovery system further comprises:
   f. blower means along said branch inlet duct for directing ambient air through said branch inlet duct in heat exchange relation with said pathway of said heat transfer means and into said home heating system;
   g. blower control means for selectively shifting said blower between on and off conditions, including means that can operate said blower when in the on condition, said means being responsive to temperate conditions.

6. A heat recovery system as claimed in claim 4 further comprising:
   f. exhaust by-pass means for conveying said exhaust gases toward said vent out of heat exchange with said duct when heating is not desired; and
   g. exhaust control means for selectively directing exhaust gases through said exhaust by-pass means rather than through said pathway.

7. A heat recovery system as claimed in claim 4 further comprising:
   f. duct by-pass means for conveying air in said home heating system out of heat exchange with said pathway when heating is not desired; and
   g. duct control means for selectively directing air through said duct by-pass means rather than through said duct.

8. A heat recovery system comprising:
   a. a clothes drier having an exhaust port through which exhaust gases can be released;
   b. a home heating system through which blown air can pass;
   c. heat exchanger means for transferring heat from said drier exhaust gases to said home blown air; and
   d. means for controlling the passage of blown air and exhaust gases through said heat exchanger means including a blower, a seasonal adjustment switch having winter and summer positions and a temperature responsive switch; said blower blowing air through said heat exchanger means only when said seasonal adjustment switch is in the winter position and when said temperature responsive switch senses temperatures above a set temperature from said drier exhaust gases.

* * * * *